May 2, 1944. W. APPEL 2,348,101
AIRCRAFT TAIL WHEEL ASSEMBLY
Filed Oct. 2, 1941 2 Sheets-Sheet 1
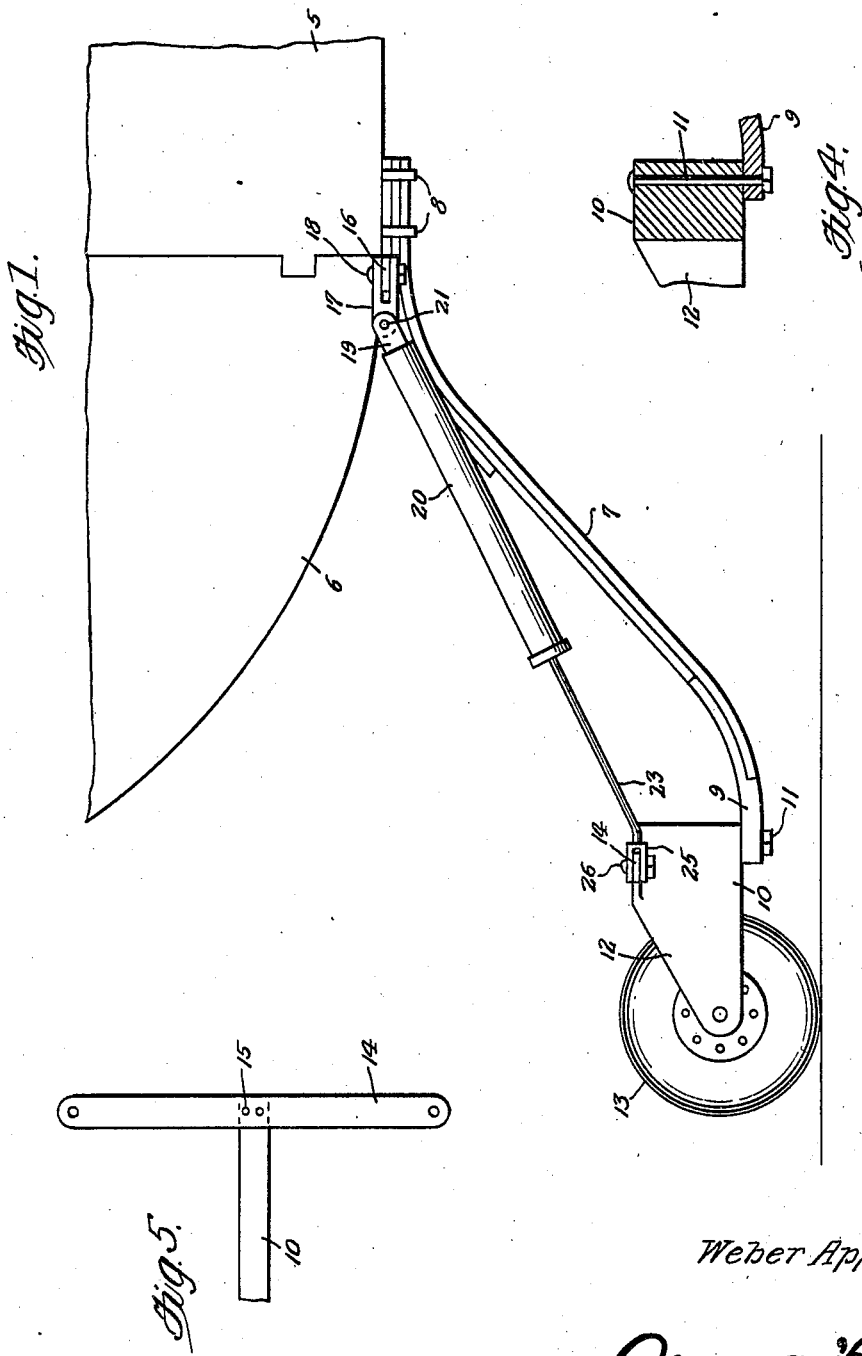
Inventor
Weber Appel.
By Clarence A. O'Brien
Attorney

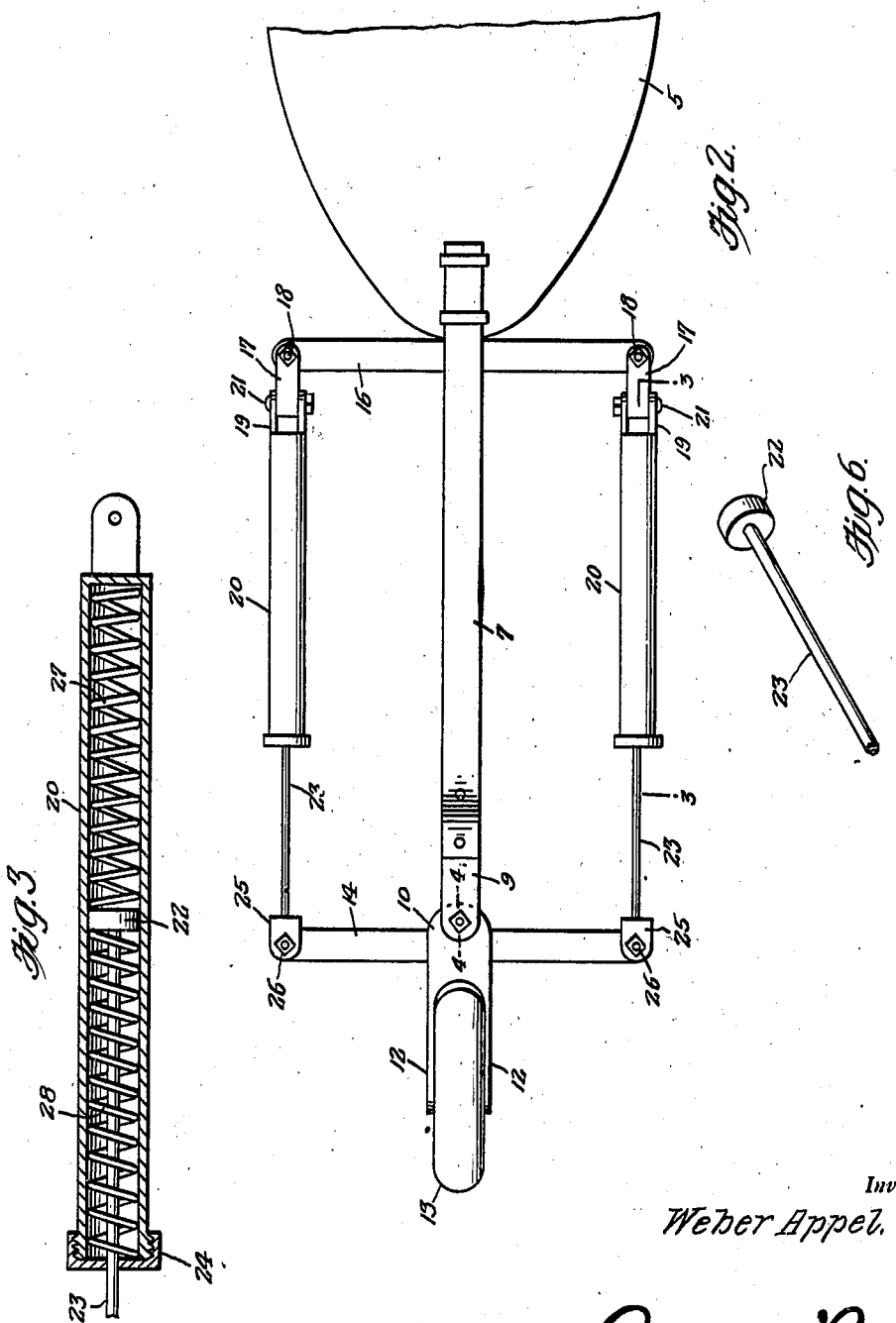

Patented May 2, 1944

2,348,101

UNITED STATES PATENT OFFICE 2,348,101

AIRCRAFT TAIL WHEEL ASSEMBLY

Weber Appel, Boise, Idaho

Application October 2, 1941, Serial No. 413,359

1 Claim. (Cl. 244—50)

This invention relates to new and useful improvements in tail wheel assemblies for aircraft.

The principal object of the invention is to provide an aircraft tail wheel assembly having an arrangement of springs which will permit self-steering of the wheel element over uneven ground.

Other objects and advantages of the invention will become apparent to the reader of the following description.

In the drawings:

Figure 1 is a fragmentary side elevational view showing the tail wheel assembly.

Figure 2 is a fragmentary bottom plan view of the structure shown in Figure 1.

Figure 3 is a fragmentary longitudinal sectional view through one of the plunger cylinders.

Figure 4 is a sectional view taken substantially on line 4—4 of Figure 2.

Figure 5 is a fragmentary top plan view showing the steering bar.

Figure 6 is a perspective view fragmentarily showing one of the plunger elements.

Referring to the drawings wherein like numerals designate like parts, it can be seen that the numeral 5 denotes the rear portion of an aircraft fuselage, numeral 6 denoting the usual rudder appended to the tail end of the fuselage.

In carrying out the present invention a slight S-shaped leaf spring 7 is employed, one end of which is secured by U clamps or the like 8 to the rear portion of the fuselage 5. This leaf spring extends downwardly and rearwardly, terminating in a plate member 9 which is secured to the bottom portion of a block 10. This plate 9 is secured pivotally to the block 10 by a suitable element 11.

The rear portion of the block 10 is bifurcated to provide side members 12 straddling a pneumatic wheel 13.

Numeral 14 denotes a steering bar which is secured by a suitable element 15 to the forward portion of the block 10 at the upper edge thereof, as is apparent in Figures 1 and 5.

Secured to the lower edge of the rudder 6 is a cross-bar 16 to the ends of which bifurcated lugs 17 are pivotally secured by elements 18.

To each of these lugs 17 an ear 19 on the corresponding end of a cylinder 20 is pivotally secured as at 21.

In each of these cylinders 20 is a plunger 22 having a rod 23 extending downwardly and through a cap 24 at the lower end of the cylinder. The lower end of each of these plunger rods 23 has a bifurcated plate 25 which is pivotally secured as at 26 to the corresponding end of the steering bar 14.

In each of the cylinders 20 between the plunger 22 and the upper end of the cylinder is a push spring 27, while between the plunger 22 and the cap 24 is a pull spring 28, each of these springs being of the compression type.

It can now be seen that when the rudder 6 is operated the bar 16 will transmit motion to the corresponding cylinder 20 and swing the steering bar 14 in the desired direction, steering the wheel 13. This will cause steering of the rear wheel to permit quick turning of the airplane when taxiing into any desired position on an air field.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A tail wheel assembly for aircraft wherein the aircraft is equipped with a rudder, a cross-bar on the rudder, a leaf spring suspension arm, a wheel, a mount for the wheel pivotally secured to the leaf spring for turning about an axis parallel with that of the rudder, a steering bar on the mount, connections between the ends of the last-mentioned bar and the ends of the bar carried by the rudder, cylinders in the said connections, and springs in said cylinders for absorbing shock transmitted to said connections from the wheel, said connections forming rigid vertically floating units and together with said bars forming a parallel link motion.

WEBER APPEL.